(12) United States Patent
Jiang et al.

(10) Patent No.: US 10,503,214 B2
(45) Date of Patent: Dec. 10, 2019

(54) PORTABLE ELECTRONIC DEVICE AND SUPPORT DEVICE THEREOF

(71) Applicant: PEGATRON CORPORATION, Taipei (TW)

(72) Inventors: Cheng-Shi Jiang, Taipei (TW); Yen-Chi Kuo, Taipei (TW); Tzu-Ming Yang, Taipei (TW); Yu-Hao Chiu, Taipei (TW); Yu-Shu Zheng, Taipei (TW); Jeng-Hong Chiu, Taipei (TW); Chih-Ming Chen, Taipei (TW); Chih-Liang Chiang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/206,355

(22) Filed: Nov. 30, 2018

(65) Prior Publication Data

US 2019/0212773 A1 Jul. 11, 2019

(30) Foreign Application Priority Data

Jan. 10, 2018 (TW) .............................. 107100953 A

(51) Int. Cl.
*G06F 1/16* (2006.01)

(52) U.S. Cl.
CPC ............ *G06F 1/166* (2013.01); *G06F 1/1681* (2013.01); *G06F 1/1616* (2013.01)

(58) Field of Classification Search
CPC ...... G06F 1/1616; G06F 1/1681; G06F 1/203; G06F 1/1633; G06F 1/1624; G06F 1/166
See application file for complete search history.

(56) References Cited

U.S. PATENT DOCUMENTS 8,879,251 B2 * 11/2014 Hsiu ....................... G06F 1/166
361/679.59

FOREIGN PATENT DOCUMENTS

| TW | I403879 B1 | 8/2013 |
| TW | M473546 U | 3/2014 |
| TW | 201415984 A | 4/2014 |
| TW | M539210 U | 4/2017 |

OTHER PUBLICATIONS

Office Action in corresponding TW patent application 10720934660, dated Nov. 19, 2018, 13 pages.

* cited by examiner

*Primary Examiner* — Jinhee J Lee
*Assistant Examiner* — Ingrid D Wright
(74) *Attorney, Agent, or Firm* — Muncy, Geissler, Olds & Lowe, P.C.

(57) ABSTRACT

The application discloses a support device, mounted in a portable electronic device, including an upper-cover shell, a base shell, and a pivot. The support device includes a cam structure, a first rod member, a second rod member, and a support member. The cam structure is connected to the pivot. The first pivot portion and the second pivot are pivotally connected to the base shell. The first rod member is in contact with the cam structure, and includes a first slide portion. The second rod member includes a second slide portion, movably connected to the first slide portion. The support member penetrates through an opening of the base shell, where a top surface of the support member and the second rod member are in contact with each other.

20 Claims, 6 Drawing Sheets

PORTABLE ELECTRONIC DEVICE AND SUPPORT DEVICE THEREOF

CROSS-REFERENCE TO RELATED APPLICATION

This non-provisional application claims priority under 35 U.S.C. § 119(a) to Patent Application No. 107100953 filed in Taiwan, R.O.C. on Jan. 10, 2018, the entire contents of which are hereby incorporated by reference.

BACKGROUND

Technical Field

The application relates to a portable electronic device, and in particular, to a support device of a portable electronic device.

Related Art

Usually, when a notebook computer is used, the notebook computer placed on a desktop, and there is no reserved space between the base of the notebook computer and the desktop. Hence, a problem that heat dissipation of electronic components in the base is insufficient is likely to be caused. Current design is disposing an elevating structure, such as rubber salient points or plastic foot frames, on a bottom surface of the base, to elevate the base, thereby reserving a gap between the base and a desktop.

However, disposing an elevating structure, such as rubber salient points or plastic foot frames, on a bottom surface of the base would increase the entire thickness of a notebook computer. To avoid an excessive thick body of the notebook computer, a height of the elevating structure is usually designed to range from 1.5 mm to 3 mm, and a heat dissipation assistance effect of such a height has is limited. Moreover, the height that can be elevated by the elevating structure is a fixed height and cannot be adjusted according to requirements of a user.

SUMMARY

In view of the foregoing problems, a main objective of the application is to provide a portable electronic device and a support device thereof, where a supporting height of the portable electronic device can be adjusted according to an opening angle between an upper cover and a base of the portable electronic device, so as to resolve a problem that a height of an elevating structure of an conventional portable electronic device is fixed.

To achieve the foregoing objective, the application provides a portable electronic device, including an upper-cover shell, a base shell, a pivot, and a support device. The base shell includes an opening. One end of the pivot is connected to the base shell and the other end thereof is connected to the upper-cover shell. The support device is disposed in the base shell, and the support device includes a cam structure, a first rod member, a second rod member, and a support member. The cam structure is connected to the pivot. The first rod member includes a first pivot portion, a stressed portion, and a first slide portion, where the first pivot portion is pivotally connected to the base shell, the first pivot portion is located between the stressed portion and the first slide portion, and the stressed portion and the cam structure are in contact with each other. The second rod member includes a second pivot portion, a second slide portion, and a stress application portion, where the second pivot portion is pivotally connected to the base shell, the second pivot portion is located between the second slide portion and the stress application portion, and the second slide portion is movably connected to the first slide portion. a support member penetrates through the opening of the base shell, where a top surface of the support member and the stress application portion are in contact with each other. When the upper-cover shell is opened by means of the pivot relative to the base shell, the cam structure rotates and pushes the stressed portion of the first rod member, the first slide portion and the second slide portion move relative to each other, and make the stress application portion of the second rod member to push the support member, and the support member protrudes out of the opening.

To achieve the foregoing objective, the application additionally provides a support device, mounted in a portable electronic device, including an upper-cover shell, a base shell, and a pivot. The pivot is connected to the upper-cover shell and the base shell separately, and the base shell includes an opening. The support device includes a cam structure, a first rod member, a second rod member, and a support member. The cam structure is connected to the pivot. The first rod member includes a first pivot portion, a stressed portion, and a first slide portion, where the first pivot portion is pivotally connected to the base shell, the first pivot portion is located between the stressed portion and the first slide portion, and the stressed portion and the cam structure are in contact with each other. The second rod member includes a second pivot portion, a second slide portion, and a stress application portion, where the second pivot portion is pivotally connected to the base shell, the second pivot portion is located between the second slide portion and the stress application portion, and the second slide portion is movably connected to the first slide portion. A support member penetrates through the opening of the base shell, where a top surface of the support member and the stress application portion are in contact with each other. When the upper-cover shell is opened by means of the pivot relative to the base shell, the cam structure rotates and pushes the stressed portion of the first rod member, the first slide portion and the second slide portion move relative to each other, and make the stress application portion of the second rod member to push the support member, and the support member protrudes out of the opening.

According to an embodiment of the application, when the upper-cover shell is opened relative to the base shell, the cam structure pushes the first rod member, the stressed portion moves toward a first direction approaching the opening, the first slide portion moves toward a second direction away from the opening, the second slide portion, together with the first slide portion, moves toward the second direction, and the stress application portion moves toward the first direction, and pushes the support member.

According to an embodiment of the application, the support device further includes an elastic member, and the elastic member is sleeved over the support member. When the upper-cover shell is closed relative to the base shell, the elastic member provides an elastic force to the support member, the support member pushes the stress application portion to move toward the second direction, the first slide portion, together with the second slide portion, moves toward the first direction, and the stressed portion moves toward the second direction.

According to an embodiment of the application, the support member includes a support column and a limiting portion, the limiting portion is located on the top surface of the support column, the elastic member is sleeved over the support column, and the elastic member is located between the limiting portion and the base shell.

According to an embodiment of the application, the stressed portion and the first slide portion are respectively located on two opposite ends of the first rod member, and the second slide portion and the stress application portion are respectively located on two opposite ends of the second rod member.

According to an embodiment of the application, after the first slide portion and the second slide portion move relative to each other, a predetermined angle is formed between the first rod member and the second rod member, and the predetermined angle is less than 180°.

According to an embodiment of the application, when the upper-cover shell and the base shell are arranged in a stacking manner, the first rod member and the second rod member are horizontally arranged.

According to an embodiment of the application, the first slide portion is a slide rail, and the second slide portion is a protruding portion or a pulley.

According to an embodiment of the application, the cam structure includes an axis and a cam portion, the axis is connected to the pivot, and the cam portion and the stressed portion of the first rod member are in contact with each other.

According to an embodiment of the application, the cam portion includes a plane and a cambered surface, when the upper-cover shell and the base shell are arranged in a stacking manner, the plane is located on the stressed portion, and when the upper-cover shell is opened relative to the base shell, the cambered surface pushes the stressed portion.

In view of the above, in a portable electronic device and a support device thereof according to the application, when the upper-cover shell is opened relative to the base shell, the cam structure rotates with the pivot and pushes the first rod member, the first slide portion and the second slide portion move relative to each other and actuate the second rod member to push the support member, and the support member protrudes out of the opening. In this way, as the angle by which the upper-cover shell is opened differs, the height by which the support member is pushed to protrude out of the opening also differs, so that the height by which the portable electronic device is elevated can be adjusted.

DETAILED DESCRIPTION OF THE EMBODIMENTS

To enable the examiner to understand the technical content of the application better, descriptions of specific preferred embodiment are provided below particularly.

Figure 1:
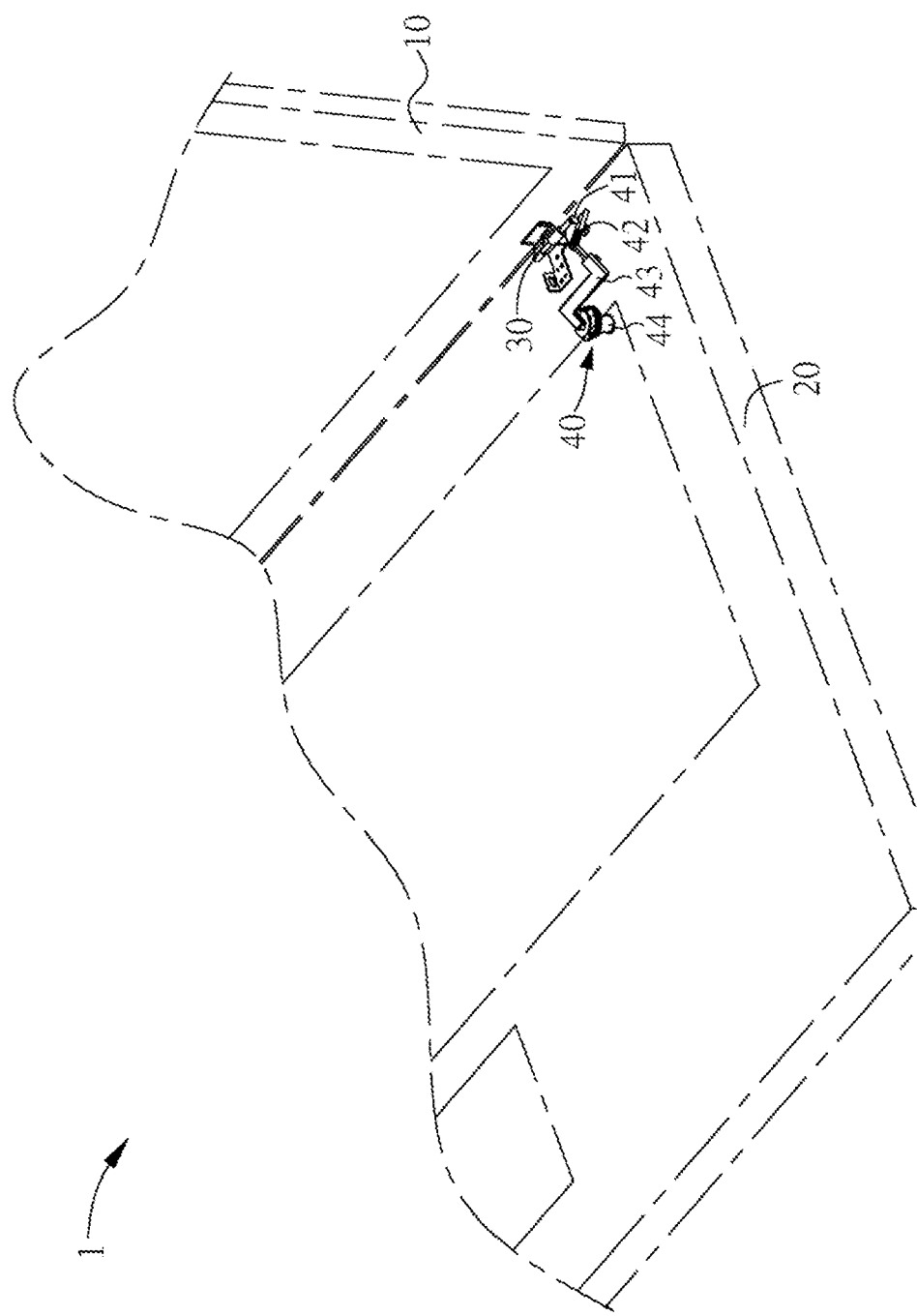
FIG. 1 is a schematic diagram of a portable electronic device according to an embodiment of the application.
Figure 2:
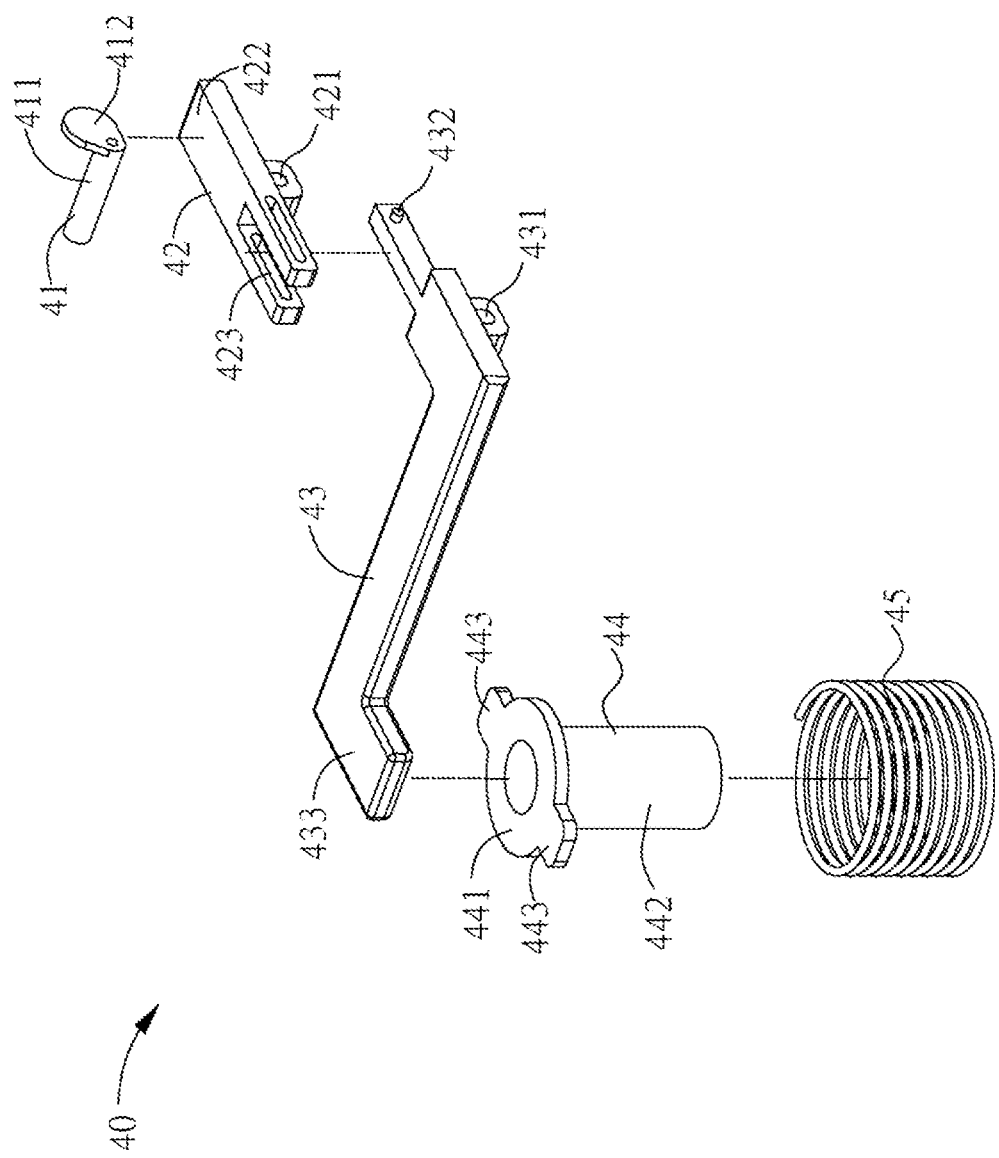
FIG. 2 is a schematic exploded view of a support structure shown in FIG. 1.

FIG. 1 is a schematic diagram of a portable electronic device according to an embodiment of the application, and FIG. 2 is a schematic exploded view of a support structure shown in FIG. 1. Refer to FIG. 1 and FIG. 2 together. A portable electronic device 1 of this embodiment includes an upper-cover shell 10, a base shell 20, a pivot 30, and a support device 40, and one end of the pivot 30 is connected to the base shell 20, and the other end thereof is connected to the upper-cover shell 10, so that the upper-cover shell 10 can be opened or closed relative to the base shell 20. In this embodiment, the portable electronic device 1 being a notebook computer is used as an example, the upper-cover shell 10 is a display screen, and the base shell 20 is a base provided with a keyboard and main electronic components. In other embodiments, the portable electronic device 1 may alternatively be another portable electronic device including an upper cover and a base, for example, a tablet computer attached with a keyboard.

Figure 3A:
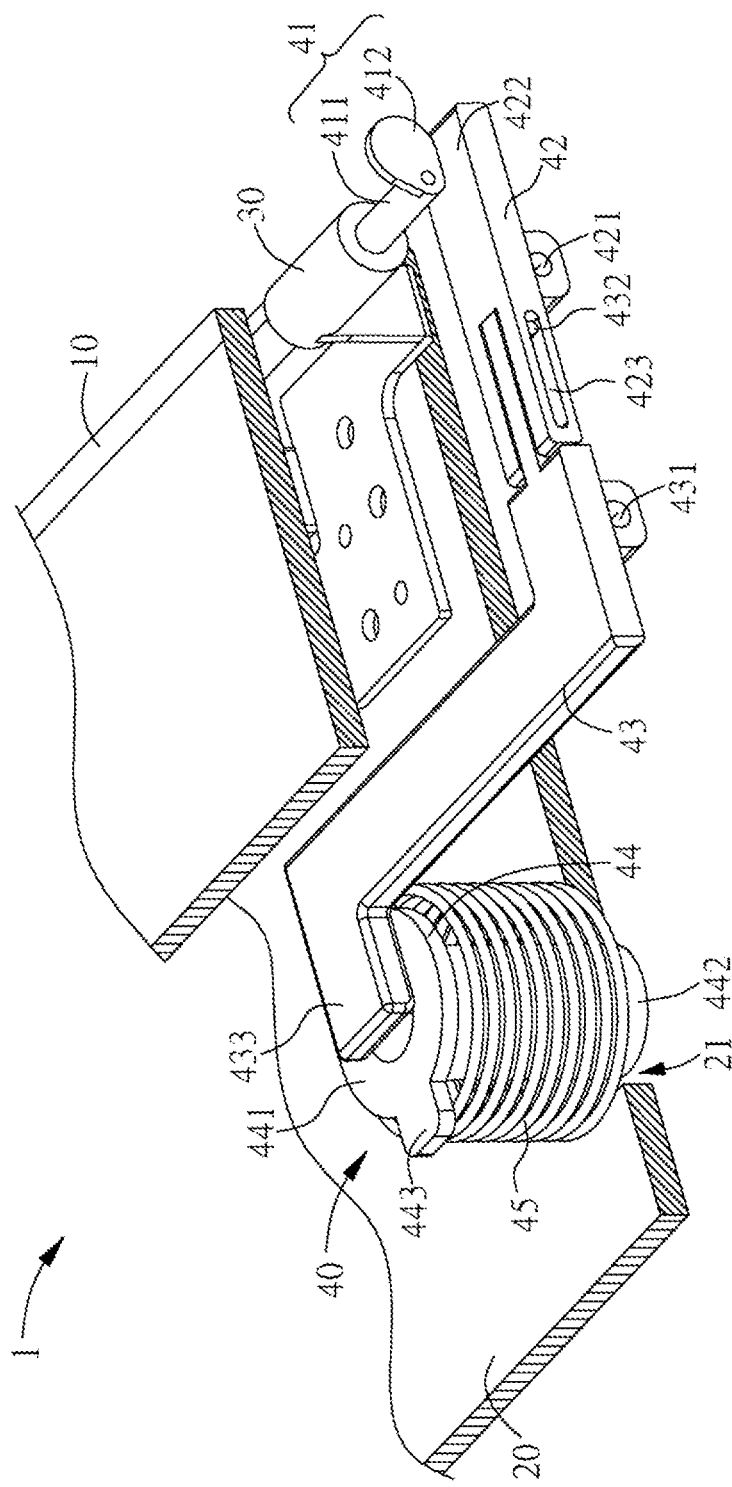
FIG. 3A is a schematic enlarged diagram of a support device when the portable electronic device shown in FIG. 1 is in a closed state.
Figure 3B:
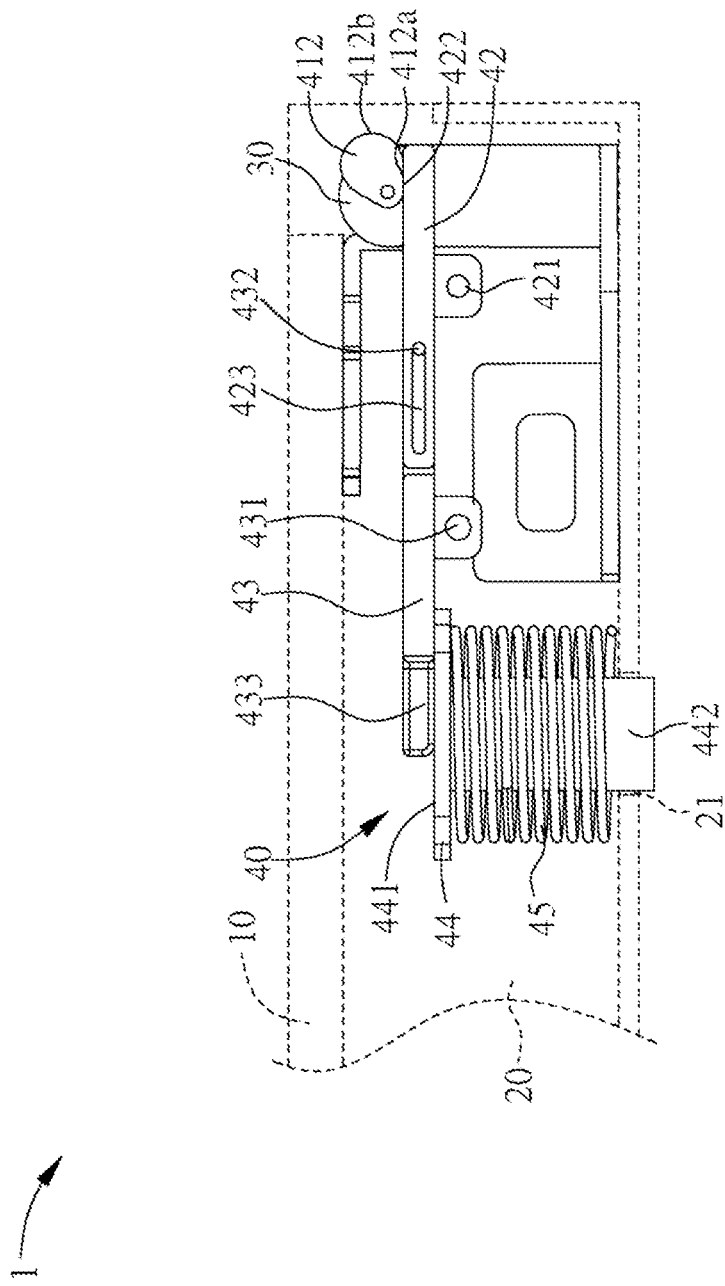
FIG. 3B is a schematic side view of the support device shown in FIG. 3A.

In this embodiment, the support device 40 is disposed in the base shell 20, and the support device 40 includes a cam structure 41, a first rod member 42, a second rod member 43, a support member 44, and an elastic member 45. FIG. 3A is a schematic enlarged diagram of a support device when the portable electronic device shown in FIG. 1 is in a closed state, and FIG. 3B is a schematic side view of the support device shown in FIG. 3A. Refer to FIG. 3A and FIG. 3B together. In this embodiment, the cam structure 41 is connected to the pivot 30, and when the upper-cover shell 10 is opened relative to the base shell 20, the cam structure 41 can rotate together with the pivot 30. Specifically, the cam structure 41 includes an axis 411 and a cam portion 412, the axis 411 is connected to the pivot 30, and the cam portion 412 and the first rod member 42 are in contact with each other.

The first rod member 42 includes a first pivot portion 421, a stressed portion 422, and a first slide portion 423. The first pivot portion 421 is pivotally connected to the base shell 20. For example, a component such as a support or a protruding portion is formed in the base shell 20, so that the first pivot portion 421 can be pivotally fixed to the base shell 20. It should be noted that to make the figure clear, a fixed support or protruding portion component is not drawn in the base shell 20. In addition, in another embodiment, the support device 40 can alternatively be disposed on a sidewall close to the base shell 20, and the first pivot portion 421 can alternatively be fixed to a sidewall of the base shell 20. No limitation is imposed in the application.

In this embodiment, a position, in contact with the first rod member 42, of the cam portion 412 is referred to as the stressed portion 422. In other words, the cam portion 412 of the cam structure 41 and the stressed portion 422 of the first rod member 42 are in contact with each other, so that the cam structure 41 can push the first rod member 42. As shown in FIG. 3B, in this embodiment, the cam portion 412 includes a plane 412 and a cambered surface 421b. When the portable electronic device 1 is in a closed state, that is, the upper-cover shell 10 and the base shell 20 are arranged in a stacking manner, a plane 412a is located on the stressed portion 422. Further, when the upper-cover shell 10 is opened relative to the base shell 20, the cambered surface 421b can push the stressed portion 422. Connection relationship of respective components are first described below, and further, details of actions are described subsequently.

In this embodiment, the first pivot portion 421 is located between the stressed portion 422 and the first slide portion 423. Preferably, the stressed portion 422 and the first slide portion 423 are respectively located on two opposite ends of the first rod member 42. Therefore, when the stressed portion 422 is pushed by the cam structure 41, its action direction is opposite to that of the first slide portion 423, and details of the actions are also further described below.

Correspondingly, the second rod member 43 includes a second pivot portion 431, a second slide portion 432, and a stress application portion 433. The second pivot portion 431 is pivotally connected to the base shell 20. Refer to the foregoing first pivot portion 421 for its fixing manner. Details are not described herein again. Likewise, the second pivot portion 431 is located between the second slide portion 432 and the stress application portion 433, and the second slide portion 432 and the stress application portion 433 can respectively be located on two opposite ends of the second rod member 43. The second slide portion 432 is located on an end proximal to the first rod member 42, so that the second slide portion 432 is movably connected to the first slide portion 423.

In this embodiment, the first slide portion 423 is a slide rail, the second slide portion 432 is a protruding portion, as shown in FIG. 2, and the second slide portion 432 (the protruding portion) is located inside the first slide portion 423 (the slide rail), and move inside the first slide portion 423. In another embodiment, the second slide portion 432 may alternatively be a pulley, or the first slide portion 423 is a protruding portion or a pulley, and the second slide portion 432 is a slide rail. No limitation is imposed in the application.

In this embodiment, the stress application portion 433 is located on an end, distal to the first rod member 42, of second rod member 43, and the stress application portion 433 and a top surface 441 of the support member 44 are in contact with each other. Specifically, the base shell 20 includes an opening 21, and the opening 21 is located at the bottom of the base shell 20. The support member 44 includes a top surface 441, the support member 44 penetrates through the opening 21 of the base shell 20, and the stress application portion 433 can push the top surface 441 of the support member 44, to make the support member 44 protrude out of the opening 21. Further, the elastic member 45 is sleeved over the support member 44, to provide an elastic force to the support member 44 for returning to an original state.

Preferably, the area of the top surface 441 may be greater than the area of the opening 21, or a limiting portion 443 is disposed on the top surface 441, to avoid the support member 44 from entirely moving out of the opening 21. In this embodiment, the support member 44 further includes a support column 442 and a limiting portion 443. The limiting portion 443 is located on the top surface 441, and the support column 442 is connected to one side of the top surface 441. To be specific, the limiting portion 443 extends outward from the top surface 441, to make the limiting portion 443 protrude out of the support column 442, thereby avoiding the support member 44 from entirely moving out of the opening 21. In addition, the limiting portion 443 can limit a position of the elastic member 45. Specifically, the elastic member 45 is sleeved over the support column 442, and the elastic member 45 is located between the limiting portion 443 and the base shell 20, so that the limiting portion 443 can limit the position of elastic member 45 while avoiding the support member 44 from entirely moving out of the opening 21.

Figure 4A:
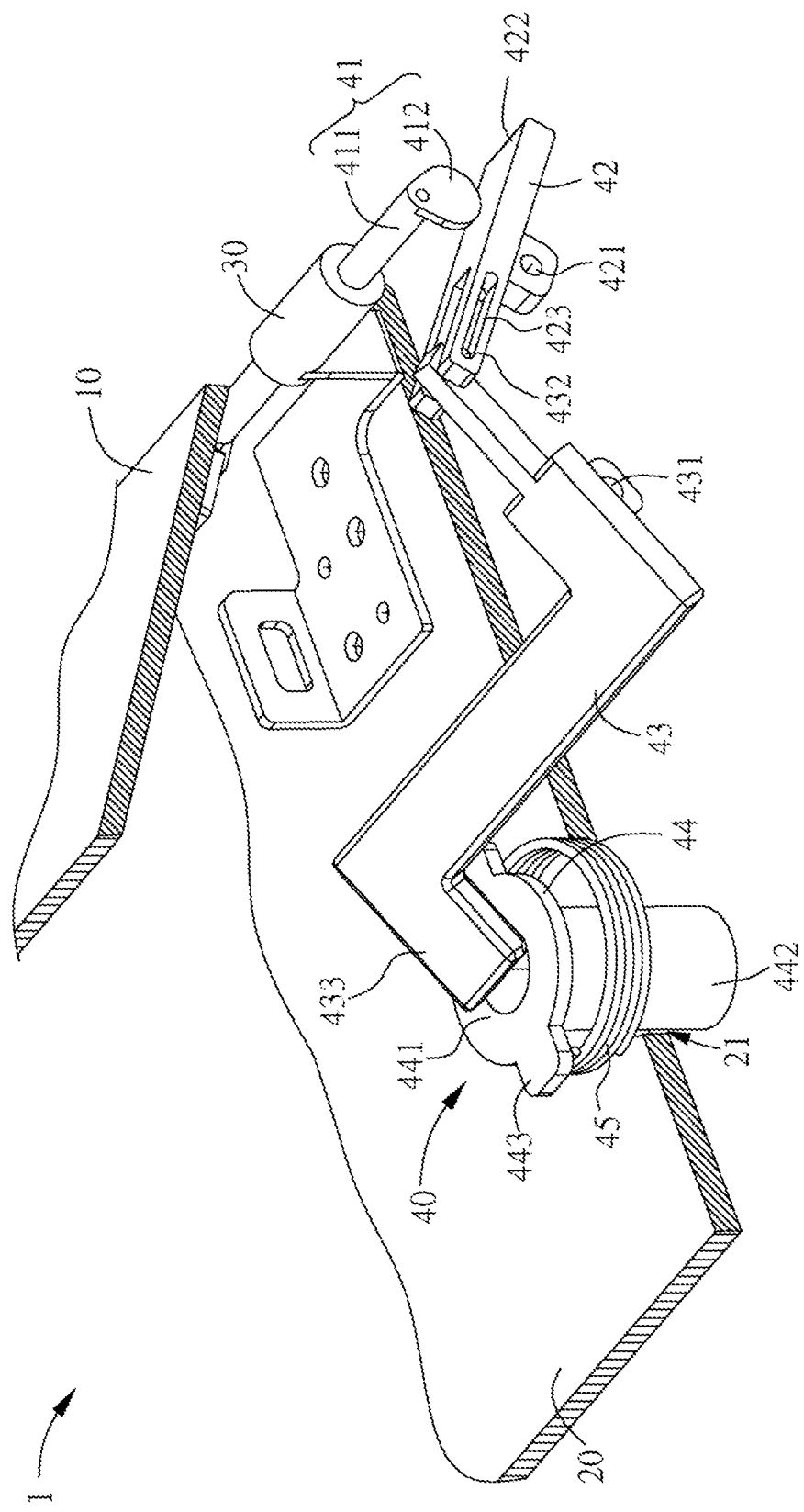
FIG. 4A is a schematic enlarged diagram of a support device when the portable electronic device shown in FIG. 1 is in an open state.
Figure 4B:
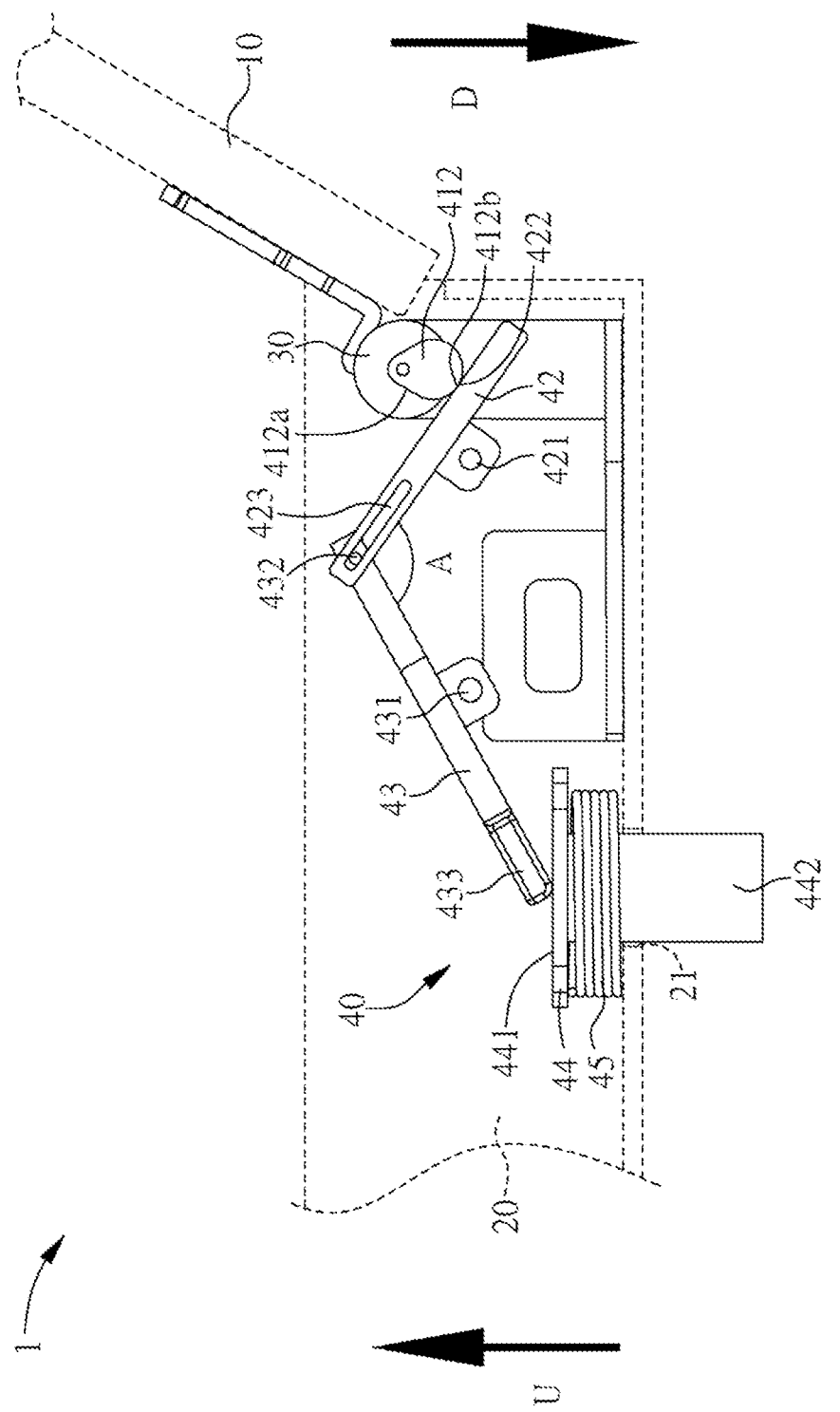
FIG. 4B is a schematic side view of the support device shown in FIG. 4A.

Actions of the support device 40 of this embodiment are described below. First, refer to FIG. 3A and FIG. 3B. It should be first noted that in this embodiment, a position at which the first pivot portion 421 is fixed to the base shell 20 and a position at which the second pivot portion 431 is fixed to the base shell 20 are on a same level. Therefore, when the portable electronic device 1 is in a closed state, that is, the upper-cover shell 10 and the base shell 20 are arranged in a stacking manner, the first rod member 42 and the second rod member 43 are horizontally arranged. Meanwhile, the plane 412a of the cam portion 412 is located on the stressed portion 422, and the second slide portion 432 is located inside the first slide portion 423. FIG. 4A is a schematic enlarged diagram of a support device when the portable electronic device shown in FIG. 1 is in an open state, and FIG. 4B is a schematic side view of the support device shown in FIG. 4A. Refer to FIG. 4A and FIG. 4B together. It should be first noted that in this embodiment, a side close to the bottom of the base shell 20 is referred to as a lower side, moving downward is referred to as a first direction D. Conversely, a side close to the upper-cover shell 10 is referred to as an upper side, and moving upward is referred to as a second direction U. That is, the second direction is opposite to the first direction.

When the upper-cover shell 10 is opened by means of the pivot 30 relative to the base shell 20, the pivot 30 actuates the cam structure 41 to rotate, and in this case, the cambered surface 421b of the cam portion 412 pushes the stressed portion 422 of the first rod member 42. Further, in this embodiment, the cam structure 41 is in contact with an upper surface of the first rod member 42, so that when the cam portion 412 pushes the stressed portion 422, the stressed portion 422 moves downward, that is, moving toward the first direction D approaching the opening 21. Further, because the first pivot portion 421 is pivotally connected to the base shell 20, and the first pivot portion 421 is located between the stressed portion 422 and the first slide portion 423, so that the first rod member 42 can act according to the lever principle. When the stressed portion 422 moves downward, the first slide portion 423 on the other end moves upward, that is, moving toward the second direction U away from the opening 21.

Meanwhile, the first slide portion 423 and the second slide portion 432 move relative to each other and actuate the stress application portion 433 of the second rod member 43 to push the support member 44. Specifically, the second slide portion 432 moves inside the first slide portion 423, and the first slide portion 423 actuates the second slide portion 432, to make the second slide portion 432 to move toward the second direction U (move upward) together with the first slide portion 423. Because both of the first slide portion 423 and the second slide portion 432 move toward the second direction U, after the first slide portion 423 and the second slide portion 432 move relative to each other, a predetermined angle A is formed between the first rod member 42 and the second rod member 43, and the predetermined angle A is less than 180°, as shown in FIG. 4A.

Likewise, because the second pivot portion 431 is located between the second slide portion 432 and the stress application portion 433, the second rod member 43 may also act according to the lever principle. When the second slide portion 432 moves toward the second direction U, the stress application portion 433 on the other end moves toward the first direction D and pushes the top surface 441 of the support member 44. Further, in this embodiment, the support member 44 is in contact with a lower surface of the second rod member 43, and when moving toward the first direction D, the stress application portion 433 can press down the support member 44, to make the support column 442 protrude out of the opening 21, so as to elevate the base shell 20, thereby achieving a heat dissipation effect.

Because the support member 44 is disposed inside the base shell 20, a length of the support column 442 can be increased without affecting the overall thickness of the impact portable electronic device 1, so that the height by which the support member 44 protrudes out of the opening 21 is greater than an elevating structure (such as rubber salient points or plastic foot frames) of an conventional portable electronic device. Further, by means of the lever design of the first rod member 42 and the second rod member 43, a length of the cambered surface 421b of the cam portion 412 may be less than a height by which the support member 44 is pressed down, to avoid that the length of the cambered surface 421b of the cam portion 412 is insufficient to completely press down the support member 44. Therefore, even though the size of the cam portion 412 is small, the support member 44 can be effectively pushed out of the opening 21.

In addition, in this embodiment, the cam structure 41 is connected to the pivot 30, and when the upper-cover shell 10 is opened relative to the base shell 20, the cam structure 41 can rotate together with the pivot 30 and push the stressed portion 422 of the first rod member 42. The first slide portion 423 on the other end actuates the second slide portion 432 of the second rod member 43 to move together, and make the stress application portion 433 on the other end push the support member 44 to protrude out of the opening 21. Therefore, as the angle by which the upper-cover shell 10 is opened differs, the height by which the support member 44 is pushed to protrude out of the opening 21 also differs, so that while the upper-cover shell 10 is opened, the height of the base shell 20 can also be adjusted. For example, when this embodiment is designed as that the angle by which the upper-cover shell 10 is opened relative to the base shell 20 is 0°, 30°, 60°, 90°, or 120°, the height by which the support member 44 protrudes out of the opening 21 is 0.5 cm, 1.2 cm, 2.2 cm, and 4 cm. In another embodiment, the height by which the support member 44 protrudes out of the opening 21 can alternatively be adjusted by changing the shape of the cam portion 412 or the lengths of the first rod member 42 and the second rod member 43.

In addition, when the support member 44 is pushed to protrude out of the opening 21, the elastic member 45 is compressed. It should be noted that the in this embodiment, the pivot 30 is a torsion shaft, and a torque force of the pivot 30 is greater than the elastic force of the elastic member 45. Therefore, when the upper-cover shell 10 is opened relative to the base shell 20, the stress application portion 433 of the second rod member 43 can continuously push the support member 44, and no springback would occur. When the upper-cover shell 10 is closed relative to the base shell 20, the elastic member 45 provides an elastic force to the support member 44, to make the support member 44 push the stress application portion 433 to move toward the second direction U (upward) and the first slide portion 432 on the other end move toward the first direction D (downward). The first slide portion 423 of the first rod member 42, together with the second slide portion 432, moves toward the first direction D, and the stressed portion 422 on the other end moves toward the second direction U, to return to the state in which the first rod member 42 and the second rod member 43 are horizontally arranged, as shown in FIG. 3A and FIG. 3B.

The application further provides a support device, mounted in a portable electronic device. The portable electronic device includes an upper-cover shell, a base shell, and a pivot. The pivot is connected to the upper-cover shell and the base shell separately. The support device is disposed in the base shell, and includes a cam structure, a first rod member, a second rod member, a support member, and an elastic member. For details about respective components and their connection relationships and action relationships between the support device and the upper-cover shell, the base shell, and the pivot, refer to the support device 40 in the foregoing embodiments. Details are not described herein again.

In conclusion, in a portable electronic device and a support device thereof according to the application, when the upper-cover shell is opened relative to the base shell, the cam structure rotates with the pivot and pushes the first rod member, the first slide portion and the second slide portion move relative to each other and actuate the second rod member to push the support member, and the support member protrudes out of the opening. Further, as the angle by which the upper-cover shell is opened differs, the height by which the support member is pushed to protrude out of the opening also differs, so that the height by which the portable electronic device is elevated can be adjusted.

It should be noted that the foregoing embodiments are examples for facilitating description, and the scope of right claimed by the application should be subject to the claims of this application, and is not limited to the foregoing embodiments.

What is claimed is:

1. A portable electronic device, comprising
an upper-cover shell;
a base shell, comprising an opening;
a pivot, whereof one end is connected to the base shell and the other end is connected to the upper-cover shell; and
a support device, disposed in the base shell and comprising:
a cam structure, connected to the pivot;
a first rod member, comprising a first pivot portion, a stressed portion, and a first slide portion, wherein the first pivot portion is pivotally connected to the base shell, the first pivot portion is located between the stressed portion and the first slide portion, and the stressed portion and the cam structure are in contact with each other;
a second rod member, comprising a second pivot portion, a second slide portion, and a stress application portion, wherein the second pivot portion is pivotally connected to the base shell, the second pivot portion is located between the second slide portion and the stress application portion, and the second slide portion is movably connected to the first slide portion; and
a support member, penetrating through the opening of the base shell, wherein a top surface of the support member and the stress application portion are in contact with each other, when the upper-cover shell is opened by means of the pivot relative to the base shell, the cam structure rotates and pushes the stressed portion of the first rod member, the first slide portion and the second slide portion move relative to each other, and make the stress application portion of the second rod member to push the support member, and the support member protrudes out of the opening.

2. The portable electronic device according to claim 1, wherein when the upper-cover shell is opened relative to the base shell, the cam structure pushes the first rod member, the stressed portion moves toward a first direction approaching the opening, the first slide portion moves toward a second direction away from the opening, the second slide portion, together with the first slide portion, moves toward the second direction, and the stress application portion moves toward the first direction, and pushes the support member.

3. The portable electronic device according to claim 2, wherein the support device further comprises an elastic member, the elastic member is sleeved over the support member, when the upper-cover shell is closed relative to the base shell, the elastic member provides an elastic force to the support member, the support member pushes the stress application portion to move toward the second direction, the first slide portion, together with the second slide portion, moves toward the first direction, and the stressed portion moves toward the second direction.

4. The portable electronic device according to claim 3, wherein the support member comprises a support column and a limiting portion, the limiting portion is located on the top surface of the support column, the elastic member is sleeved over the support column, and the elastic member is located between the limiting portion and the base shell.

5. The portable electronic device according to 1, wherein the stressed portion and the first slide portion are respectively located on two opposite ends of the first rod member, and the second slide portion and the stress application portion are respectively located on two opposite ends of the second rod member.

6. The portable electronic device according to 1, wherein after the first slide portion and the second slide portion move relative to each other, a predetermined angle is formed between the first rod member and the second rod member, and the predetermined angle is less than 180°.

7. The portable electronic device according to claim 6, wherein when the upper-cover shell and the base shell are arranged in a stacking manner, the first rod member and the second rod member are horizontally arranged.

8. The portable electronic device according to claim 1, wherein the first slide portion is a slide rail, and the second slide portion is a protruding portion or a pulley.

9. The portable electronic device according to claim 1, wherein the cam structure comprises an axis and a cam portion, the axis is connected to the pivot, and the cam portion and the stressed portion of the first rod member are in contact with each other.

10. The portable electronic device according to claim 9, wherein the cam portion comprises a plane and a cambered surface, when the upper-cover shell and the base shell are arranged in a stacking manner, the plane is located on the stressed portion, and when the upper-cover shell is opened relative to the base shell, the cambered surface pushes the stressed portion.

11. A support device, mounted in a portable electronic device, comprising an upper-cover shell, a base shell, and a pivot, wherein the pivot is connected to the upper-cover shell and the base shell separately, and the base shell comprises an opening, the support device comprising:
 a cam structure, connected to the pivot;
 a first rod member, comprising a first pivot portion, a stressed portion, and a first slide portion, wherein the first pivot portion is pivotally connected to the base shell, the first pivot portion is located between the stressed portion and the first slide portion, and the stressed portion and the cam structure are in contact with each other;
 a second rod member, comprising a second pivot portion, a second slide portion, and a stress application portion, wherein the second pivot portion is pivotally connected to the base shell, the second pivot portion is located between the second slide portion and the stress application portion, and the second slide portion is movably connected to the first slide portion; and
 a support member, penetrating through the opening of the base shell, wherein a top surface of the support member and the stress application portion are in contact with each other, when the upper-cover shell is opened by means of the pivot relative to the base shell, the cam structure rotates and pushes the stressed portion of the first rod member, the first slide portion and the second slide portion move relative to each other, and make the stress application portion of the second rod member to push the support member, and the support member protrudes out of the opening.

12. The support device according to claim 11, wherein when the cam structure pushes the first rod member, the stressed portion moves toward a first direction approaching the opening, the first slide portion moves toward a second direction away from the opening, the second slide portion, together with the first slide portion, moves toward the second direction, and the stress application portion moves toward the first direction, and pushes the support member.

13. The support device according to claim 12, wherein the support device further comprises an elastic member, the elastic member is sleeved over the support member, when the upper-cover shell is closed relative to the base shell, the elastic member provides an elastic force to the support member, the support member pushes the stress application portion to move toward the second direction, the first slide portion, together with the second slide portion, moves toward the first direction, and the stressed portion moves toward the second direction.

14. The support device according to claim 13, wherein the support member comprises a support column and a limiting portion, the limiting portion is located on the top surface of the support column, the elastic member is sleeved over the support column, and the elastic member is located between the limiting portion and the base shell.

15. The support device according to 11, wherein the stressed portion and the first slide portion are respectively located on two opposite ends of the first rod member, and the second slide portion and the stress application portion are respectively located on two opposite ends of the second rod member.

16. The support device according to 11, wherein after the first slide portion and the second slide portion move relative to each other, a predetermined angle is formed between the first rod member and the second rod member, and the predetermined angle is less than 180°.

17. The support device according to claim 16, wherein when the upper-cover shell and the base shell are arranged in a stacking manner, the first rod member and the second rod member are horizontally arranged.

18. The support device according to claim 11, wherein the first slide portion is a slide rail, and the second slide portion is a protruding portion or a pulley.

19. The support device according to claim 11, wherein the cam structure comprises an axis and a cam portion, the axis is connected to the pivot, and the cam portion and the stressed portion of the first rod member are in contact with each other.

20. The support device according to claim 19, wherein the cam portion comprises a plane and a cambered surface, when the upper-cover shell and the base shell are arranged in a stacking manner, the plane is located on the stressed portion, and when the upper-cover shell rotates relative to the base shell, the cambered surface pushes the stressed portion.

\* \* \* \* \*